United States Patent Office 3,004,054
Patented Oct. 10, 1961

3,004,054
PROCESS FOR THE MANUFACTURE OF MIXED PHOSPHOROTHIOATE ESTERS
William R. Smithey, Jr., Richmond, Va., assignor to Virginia-Carolina Chemical Corporation, Richmond, Va., a corporation of Virginia
No Drawing. Filed May 23, 1960, Ser. No. 30,740
8 Claims. (Cl. 260—461)

This invention relates to an improved process for the manufacture of O-aryl O,O-dialkyl phosphorothioates. These compounds have a variety of pesticidal activities such as, for example, insecticides and nematocides.

There are several known methods by which these compounds may be prepared. In one method, a phenol, an O,O-dialkyl phosphorohalidothioate, and sodium carbonate are placed in methyl ethyl ketone and the mixture is heated at reflux. The compounds may also be prepared by the reactions of an O-aryl phosphorodihalidothioate with an alkali metal alkoxide or of an O,O-dialkyl phosphorohalidothioate with an alkali metal phenoxide. In still another method, the compounds are prepared by the addition of an O,O-dialkyl phosphorohalidothiate to an aqueous solution of an alkali metal phenoxide having therein a copper catalyst. The compounds may also be prepared by the last-named method when the copper catalyst is omitted.

Each of the known methods has certain disadvantages. The sodium carbonate method requires large quantities of organic solvents; as does the procedure using, for example, the O-aryl phosphorodihalidothioate and an alkali metal alkoxide. Also, when sodium carbonate and an organic solvent are used, the time required to complete the reaction is approximately eight hours. Further, by certain of these methods, yields of the phosphorothioate compound may not exceed 55% of the theoretical, based on the phosphorohalidothiate. Better product yields are obtained in the process where an O,O-dialkyl phosphorohalidothiate is added to an aqueous solution of an alkali metal hydroxide and a phenol. However, the process is still unsatisfactory because of the large amount of water required as a solvent and diluent. An amout of water equal to about 30% of the total weight must be present in order to obtain the best results. Thus, large costly equipment and expensive drying operations are needed.

It can be seen from the above that each method has at least one fault in common. They all require, or contain, excessive solvent or diluent. Simple economics conclude that excessive or unnecessary diluents add to the costs and make a given process commercially unattractive.

It is therefore a general object of this invention to provide an improved, economical, commercial process for the manufacture of O-aryl O,O-dialkyl phosphorothioates.

A more specific object is to provide a process which requires less solvent in the reaction stage than presently known methods; thereby a greater quantity of product is produced without an increase in the size of existing equipment. Still another object is to provide a process wherein higher reaction temperatures can be used over a shorter reaction time with little or no product decomposition. These and other objects will become apparent from the following discussion.

My improved process comprises the addition, in the absence of a catalyst, of an aqueous solution of an alkali metal hydroxide, the dry alkali metal hydroxide constituting preferably at least 45–50% of the total solution weight, to a solution of an O,O-dialkyl phosphorohalidothioate and a phenol. The process may be carried out at any temperature within the range of about 50°–110° C. The reaction proceeds smoothly and the heat evolved in the early stages supplies most of the energy required to sustain the reaction.

The quantity of water used is generally not sufficient to dissolve the sodium chloride formed in the reaction. Therefore, good separation, particularly of liquid products, is difficult, and the product may be removed to a wash vessel containing additional water. A cleaner product is obtained when an amount of an organic solvent, such as hexane, is placed in the wash vessel along with the water. In the preferred procedure, the product is washed with a 2.5–20% aqueous solution of an alkali metal hydroxide, then with water, and is finally recovered by removal of the solvent under reduced pressure. The solvent, of course, can be used again.

Using this procedure, each molecular proportion of the dialkyl phosphorohalidothioate requires at least one molecular proportion of each of an alkali metal hydroxide and a phenolic compound. However, it is advantageous to employ a slight excess (about 1–5%) of phenol and a corresponding excess of aqueous alkali metal hydroxide. The excess of alkali metal phenoxide formed in situ assures that the highest quantity of the phosphorohalidothioate will react to yield the expected product. Any excess alkali metal phenoxide can be recovered, and the phenol can be regenerated by adding hydrochloric acid to the phenoxide. The phenol is suitable for reuse in this state, or, if desired, it may be purified by distillation or by other means.

Reaction temperatures, within rather wide limits, are not especially critical. I have discovered that there is little difference in yield when the hydroxide is added to the mixture over the range of 50°–100° C. A temperature of 50°–70° C. is preferred because a slightly better yield is obtained. A short addition time is important, and rapid addition of the hydroxide will yield enough heat to carry the reaction temperature to about 70° C., where it can be maintained with a minimum amount of control. In plant-scale operations some cooling may be necessary and it is preferred to maintain the temperature of addition at about 50° C.

Prior art processes teach that high reaction temperatures for sustained periods materially reduce the yield of the expected phosphorothioate ester. However, in the method of my invention, a reaction temperature in the range 85°–110° C. does not give significantly reduced yields and temperatures in the upper portion of the range actually give somewhat superior yields and are to be preferred from a production standpoint. It has been shown that in my invention the higher temperatures are not only possible, but desirable, and these temperatures may be maintained for relatively long periods with no ill effects on the yield of expected product. However, low temperatures during reaction should be avoided. For example, yields at 50° C. are about 20% below those obtained with a temperature of 100°–110° C.

Times of digestion are not critical. One and two hour digestion periods produce yields which differ only slightly from each other.

The amount of water used is dependent: first, upon the quantity necessary to dissolve the required alkali metal hydroxide at the temperature at which it is to be used, e.g. room temperature; second, upon the quantity necessary to make the aqueous solution free-flowing; and third, upon the amount of water needed to effectively dissolve the sodium chloride formed in the reaction. Although the best yields are obtained when less water is employed, it is possible to obtain acceptable yields with aqueous solutions containing about 75% water, i.e. about 25% alkali metal hydroxide. For example, when using a 25% solution of sodium hydroxide, the yields were about 6–10% lower than when using a 45–50% solution of sodium hydroxide.

It was quite surprising to learn that this reaction would proceed in view of the reactivity of phosphorohalidothioates and alkali metal hydroxides. It was more surprising to find that good yields were obtained at high temperatures. It was known that water hydrolyzed the phosphorohalidothioate very slowly. It was also known that a phosphorohalidothioate would react fairly rapidly with an hydroxide in aqueous solution, even at moderate temperatures. It was logical to expect then that the phosphorohalidothioate would react preferentially with the 50% aqueous alkali metal hydroxide, even in the presence of a phenol, particularly at high temperatures. The fact that the hydroxide reacted preferentially with the phenol, without affecting the phosphorohalidothioate, afforded a new and certainly unobvious method for the preparation of these valuable products.

Aside from the enumerated advantages afforded by the present improved process, several less apparent advantages should be mentioned. First, the use of a single solution of the phosphorohalidothioate and phenol reduces the handling time, thereby increasing the value of the method as a commercial process. Heretofore, it was essential that the phenol be melted and kept molten until completion of the reaction with the hydroxide. The mutual solubility of the phosphorohalidothioate and phenol makes it possible to eliminate this time-consuming and costly melting procedure. Second, the exothermic phenol-hydroxide reaction supplies substantially all of the energy required to complete the addition step.

My improved process is carried out by placing in a suitable reaction vessel a compound of the formula

wherein R is an alkyl group containing from 1 to 5 carbon atoms and X is bromine or chlorine. A phenolic compound, R'OH, is dissolved therein with agitation. R' is a phenyl radical whose nucleus may be substituted with alkyl, alkoxy, aryl, substituted aryl, nitro, chlorine or bromine groups. The order of mixing these raw materials may be reversed, and heat may or may not be applied at this stage. Heat is not necessary, nor critical during this stage, and is merely a matter of choice. An aqueous solution of an alkali metal hydroxide, preferably sodium hydroxide containing at least 45–50% of the hydroxide by weight, is placed in a suitable dispenser and is added to the reaction mixture at temperatures in the range of 50°–100° C. The addition of the hydroxide can be regulated at such a rate that the 50°–100° C. temperature is maintained throughout the addition. Heat may have to be applied to maintain the temperatures in the higher range. Conversely, cooling may be used to facilitate rapid addition at the lower temperature. When the addition is complete, stirring is continued and heat is applied, as needed, to maintain a temperature of 85°–110° C., preferably 95°–110° C., for one to two hours.

The crude product is drained from the reactor into a wash-tank containing an organic solvent, such as hexane, and is washed with a 2.5–20% aqueous alkali metal hydroxide solution and then with water. The layers are allowed to separate. The aqueous layer is removed from contact with the organic phase and the product is recovered by removing the solvent under reduced pressure. The product may be purified further by distillation; however, it is not necessary since the process yields materials suitable in their crude state for most practical applications.

The following specific examples illustrate the practice of the invention. It is to be understood that they are illustrative and are not intended to limit the scope of the applicability of the method. Unless otherwise specified, the "parts" referred to are parts by weight.

EXAMPLE 1

*Preparation of O-2,4-dichlorophenyl O,O-diethyl phosphorothioate*

137 parts of 2,4-dichlorophenol was melted and placed in a suitable reaction vessel equipped with a stirrer, thermometer, addition means, and reflux condenser. 151 parts of O,O-diethyl phosphorochloridothioate was added to the vessel containing the phenol. There was no heat of reaction. It was not necessary to melt the phenol, and it was done only to facilitate its rapid dissolution. 33.6 parts of sodium hydroxide was dissolved in 40 parts of water (45.6% NaOH) and placed in the addition means provided. The aqueous NaOH was added to the phenol-phosphorochloridothioate mixture at 70° C. The temperature was raised to 100° C., and was maintained at 100° C., with stirring, for one hour.

The reaction mixture was cooled and the contents washed, with 200 parts of water and 395 parts of hexane, into a suitable wash vessel. The mixture was agitated and the water removed from contact with the organic layer. The organic layer was washed successively with two 100-ml. portions of 5% NaOH and 100 ml. of water. The hexane was removed from the product by distillation; first, up to 80° C. at atmospheric pressure, and then at a final pot temperature of 100° C. at 30 mm. Hg.

There was obtained 235.0 parts of crude product, which represents a 93.2% yield based on the phosphorochloridothioate. 105.4 parts of the crude product was distilled at 0.1 mm., and 100.5 parts of product was obtained; B.P. 164–169° C. The crude product was therefore 95.4% O-2,4-dichlorophenyl O,O-diethyl phosphorothioate and indicated an overall yield of 89.0%.

EXAMPLE 2

*Production of O-2,4-dichlorophenyl O,O-diethyl phosphorothioate*

A reactor was charged with 840 parts of 2,4-dichlorophenol. 923 parts of O,O-diethyl phosphorochloridothioate was added with stirring and enough heat to dissolve the two raw materials. 412 parts of 50% aqueous sodium hydroxide was fed to the phosphorochloridothioate-phenol mixture at a temperature of 50° C., using refrigeration as necessary to maintain the addition temperature. After the aqueous NaOH addition was complete, the reaction mixture, while stirring, was raised to a temperature of 110° C. and maintained at 110° C. for two hours. 124 parts of 25% sodium hydroxide, 1098 parts of water and 2410 parts of hexane were loaded into a wash tank. Stirring of the wash mixture was begun and the reactor charge was dropped into the wash tank and the wash-product mixture was stirred for 15 minutes. Stirring was stopped, the aqueous layer was allowed to settle and was drawn off. The product-hexane layer was stirred an additional 15 minutes with 488 parts of water and 124 parts of 25% NaOH. The aqueous layer again was allowed to settle and was drawn off. The hexane-product layer was transferred to a still and the hexane was removed; first, to a pot temperature of 85° C. at atmospheric pressure, and then to a final pot temperature of 93°–100° C. at 50 mm. Hg.

There was obtained 1487 parts of product, which represented a 96.3% yield based on the O,O-diethyl phosphorochloridothioate used; $n_D^{25}$ 1.5291; $d_4^{20}$ 1.300.

In addition to the product illustrated in the above examples, my new improved process is useful for the preparation of numerous aryl dialkyl phosphorothioates. The process may also be used in the preparation of mixed phosphorothioates from O,O-dialkyl phosphorochloridothioates wherein the generally preferred alkyl group contains from 1 to 5 carbon atoms. Some of the useful phenol reactants include bromo- and chloroalkylphenols, phenylphenols, phenylazophenols, methoxy- and ethoxyphenols, alkylphenols such as toluol and p-tertbutylphenol, benzylphenols, nitrophenols and dialkylaminophenols.

The method of my invention may be used to prepare the following phosphorothioate esters: O-p-isopropylphenyl O,O-diethyl phosphorothioate, O-6-chloro-o-tolyl O,O-diethyl phosphorothioate, O-2,6-di-tert-butylphenyl O,O-diethyl phosphorothioate, O-di-sec-butylphenyl O,O-diethyl phosphorothioate, O-p-tolyl O,O-diethyl phosphorothioate, O-p-tert-amylphenyl O,O-diethyl phosphorothioate, O-nonylphenyl O,O-diethyl phosphorothioate, O-o-phenylphenyl O,O-diethyl phosphorothioate, O-2-chloro-4-phenylphenyl O,O-diethyl phosphorothioate, O-p-chlorophenyl O,O-diethyl phosphorothioate, O-p-bromophenyl O,O-diethyl phosphorothioate, O-2,4,6-trichlorophenyl O,O-diethyl phosphorothioate, O-pentabromophenyl O,O-diethyl phosphorothioate, O-p-phenylazophenyl O,O-diethyl phosphorothioate, O-p-nitrophenyl O,O-diethyl phosphorothioate, O-2-chloro-4,6-dinitrophenyl O,O-diethyl phosphorothioate, O-m-diethylaminophenyl O,O-diethyl phosphorothioate, O-methoxyphenyl O,O-diethyl phosphorothioate, O-ethoxyphenyl O,O-diethyl phosphorothioate, and the corresponding esters where the O,O-dialkyl radicals are dimethyl, dipropyl, dibutyl, and diamyl.

I claim:

1. A process for the manufacture of mixed phosphorothioate esters which comprises reacting in the absence of a catalyst an alkali metal hydroxide with a mixture of a O,O-di(lower alkyl) phosphorohalidothioate and a phenol, said alkali metal hydroxide being employed as an aqueous solution containing at least 45–50% by weight thereof.

2. A process for the manufacture of mixed phosphorothioate esters which comprises the steps of mixing a compound of the formula $(RO)_2P(S)Cl$, wherein R is an alkyl group containing from 1 to 5 carbon atoms, with a phenol of the formula R'OH; wherein R' is a phenyl radical whose nucleus may be substituted with a radical selected from the group consisting of an alkyl group containing from 1 to 9 carbon atoms, lower alkoxy, phenyl, chlorophenyl, phenylazo, di(lower alkyl)amino, nitro, bromine and chlorine; and reacting therewith in the absence of a catalyst an alkali metal hydroxide, said alkali metal hydroxide being employed in the form of an aqueous solution containing at least 45–50% by weight thereof.

3. A process according to claim 2 wherein the aqueous solution of alkali metal hydroxide is added to the mixture at a temperature within the range of 50°–100° C.

4. A process according to claim 3 wherein the said aqueous solution of alkali metal hydroxide is an aqueous solution of sodium hydroxide.

5. A process according to claim 4 wherein the product, after addition of the aqueous solution of sodium hydroxide, is heated for from one to two hours at a temperature of from 85°–110° C.

6. A process according to claim 5 wherein the product after addition of the sodium hydroxide is heated for one hour at 95°–110° C., dissolved in a suitable solvent and washed with a dilute aqueous solution of an alkali metal hydroxide.

7. A process for the manufacture of O-2,4-dichlorophenyl O,O-diethyl phosphorothioate which comprises the steps of reacting in the absence of a catalyst and at a temperature of from 50°–100° C. an alkali metal hydroxide with a mixture of O,O-diethyl phosphorochloridothioate and 2,4-dichlorophenol, said alkali metal hydroxide being in an aqueous solution containing 45–50% by weight of the alkali metal hydroxide and heating the resulting mixture for from one to two hours at 95°–110°C.

8. A process according to claim 7 wherein the said alkali metal hydroxide is sodium hydroxide and wherein the product, after heating, is dissolved in a suitable organic solvent, is washed with a 2.5–20% aqueous solution of sodium hydroxide and is recovered from said solvent.

References Cited in the file of this patent

UNITED STATES PATENTS

| | | |
|---|---|---|
| 2,520,393 | Fletcher | Aug. 29, 1950 |
| 2,657,229 | Orochena | Oct. 27, 1953 |
| 2,664,437 | Fletcher | Dec. 29, 1953 |
| 2,692,891 | Young et al. | Oct. 26, 1954 |
| 2,870,187 | Schrader et al. | Jan. 20, 1959 |
| 2,928,864 | Tabor | Mar. 15, 1960 |